United States Patent [19]
Scott et al.

[11] Patent Number: 5,923,514
[45] Date of Patent: Jul. 13, 1999

[54] ELECTRONIC TRIP CIRCUIT BREAKER WITH CMR CURRENT SENSOR

[75] Inventors: Gary W. Scott, Mt. Vernon; Andy Haun, Cedar Rapids, both of Iowa

[73] Assignee: Square D Company, Palatine, Ill.

[21] Appl. No.: 08/964,897

[22] Filed: Nov. 5, 1997

[51] Int. Cl.[6] ...................................................... H02H 3/00
[52] U.S. Cl. .............................. 361/93; 361/42; 361/47; 361/102
[58] Field of Search .................................. 361/42, 44–50, 361/78, 93, 102; 335/18, 21, 38, 174, 215; 336/178; 324/117 H, 117 R; 327/419, 511

[56] References Cited

U.S. PATENT DOCUMENTS

| | | | |
|---|---|---|---|
| 3,621,334 | 11/1971 | Burns et al. | 361/45 |
| 4,425,596 | 1/1984 | Satou | 361/93 |
| 5,049,809 | 9/1991 | Wakatsuki et al. | 324/117 R |
| 5,615,075 | 3/1997 | Kim | 361/87 |

*Primary Examiner*—Jeffrey Gaffin
*Assistant Examiner*—Michael J. Sherry
*Attorney, Agent, or Firm*—Larry I. Golden; Kareem M. Irfan

[57] ABSTRACT

A current sensor has a closed loop magnetic hoop with a gap and a central aperture for receiving a conductor. An IC chip incorporating a Giant MagnetiResistive (GMR) sensor is positioned in the gap to provide a measure of the current in the conductor. A relatively small current transformer provides the necessary information about the direction of the current to an electronic trip unit for a circuit breaker as well as power supply for the IC chip and the trip unit. The trip unit operates in the presence of AC and DC faults. In a three phase power system, a single GMR chip in the proximity of three closely spaced phase conductors, together with a current measurement from the neutral line, enables trip units to operate on the occurrence of AC and DC faults.

18 Claims, 5 Drawing Sheets

ELECTRONIC TRIP CIRCUIT BREAKER WITH CMR CURRENT SENSOR

FIELD OF THE INVENTION

The invention relates to the use of Giant MagnetoResistive sensors to activate electronic trip circuit breakers in the presence of AC and DC fault currents.

BACKGROUND OF THE INVENTION

Circuit breakers are widely used in residential and industrial applications for the interruption of electrical current in power lines upon conditions of severe overcurrent caused by short circuits or by ground faults. Prior art devices have used current transformers (CTs) to sense overcurrent conditions: the output from the CT is used as input to an electronic trip breakers in which the signal indicating an overcurrent condition is used to trip the circuit breaker and interrupt the flow of electricity.

Electronic trip circuit breakers using CTs cannot sense DC current in power circuits for the reason that CTs only respond to AC current. At DC (zero) frequency, the output of a CT is zero so that a circuit incorporating a CT as a current measuring device has a 100% error. Even at frequencies of 30 Hz, prior art CT devices have a significant error in current measurement.

In order to be able to sense DC, devices using a Hall Effect element have been used. Hall effect devices require relatively large power sources, more amplification of their output signal and require the magnetic field to pass through the thin dimension of the chip rather than the length. Hall devices typically generate a signal of approximately 5 mV/100 gauss applied field and are limited to a temperature of less than 150° C. Because of their relatively low sensitivity, magnetic fields of 100–400 gauss are needed. This means that their usage is limited to high current uses; or else, bulkier magnetic cores are required to concentrate the field. Other prior art methods have relied on monitoring the voltage drop across a resistive element to measure current. For multiphase currents, the signal to noise ratio of the resistive shunt is poor: the signal to be detected could be as low as a few millivolts on a background of several hundred volts.

The present invention is a method and apparatus that overcomes the drawbacks of prior art electronic trip circuit breakers and is capable of responding to AC and DC fault currents.

SUMMARY OF THE INVENTION

The present invention uses Giant MagnetoResistive (GMR) sensors to detect ground faults in a power distribution circuit. Powered by a 20 V DC or AC source, the output of a solid state chip having a GMR sensor adjacent to a conductor is a full-wave rectified form of the current in the conductor. This is fed to the current sampling circuit of the electronic trip unit of a circuit breaker and used to trip the circuit breaker when overcurrent conditions are detected. When the GMR elements are used for fault detection on a three-phase circuit, because of the rectification of the current, additional circuitry is necessary to properly measure the ground fault current. In one embodiment, this is done by using current transformers to give current direction. With this information, the GMR currents on the three phases are combined digitally to give the ground fault current. In an alternate embodiment, ground fault sensing is accomplished by magnetically coupling together the three phase conductors. The difference between the measured GMR current and a reference neutral current is the ground fault DC current.

Examples of the more important features of the invention have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE FIGURES

For detailed understanding of the present invention, reference should be made to the following detailed description of the preferred embodiment, taken in conjunction with the accompanying drawings, in which like elements have been given like numerals, and wherein.

DETAILED DESCRIPTION OF THE INVENTION

The GMR phenomenon is a recently discovered effect found in metallic thin films consisting of magnetic layers a few nanometers thick separated by equally thin nonmagnetic layers. Large decreases in the resistance of these films is observed when a magnetic field is applied. The cause of this effect is the spin dependence of electron scattering and the spin polarization of conduction electrons in ferromagnetic metals. With layers of the proper thickness, adjacent magnetic layers couple antiferromagnetically to each other with the magnetic moments of each magnetic layer aligned antiparallel to the adjacent magnetic layers. Conduction electrons, spin polarized in one magnetic layer, are likely to be scattered as they reach the interface to an adjacent magnetic layer with antiparallel conduction electron spins. Frequent scattering results in high resistivity. An external magnetic field overcomes the antiferromagnetic coupling and achieves parallel alignment of moments in adjacent ferromagnetic layers. The spin dependent scattering of conduction electrons is thereby decreased and resistivity decreases. GMR sensors have much greater sensitivities than Hall effect sensors.

Figure 1A:
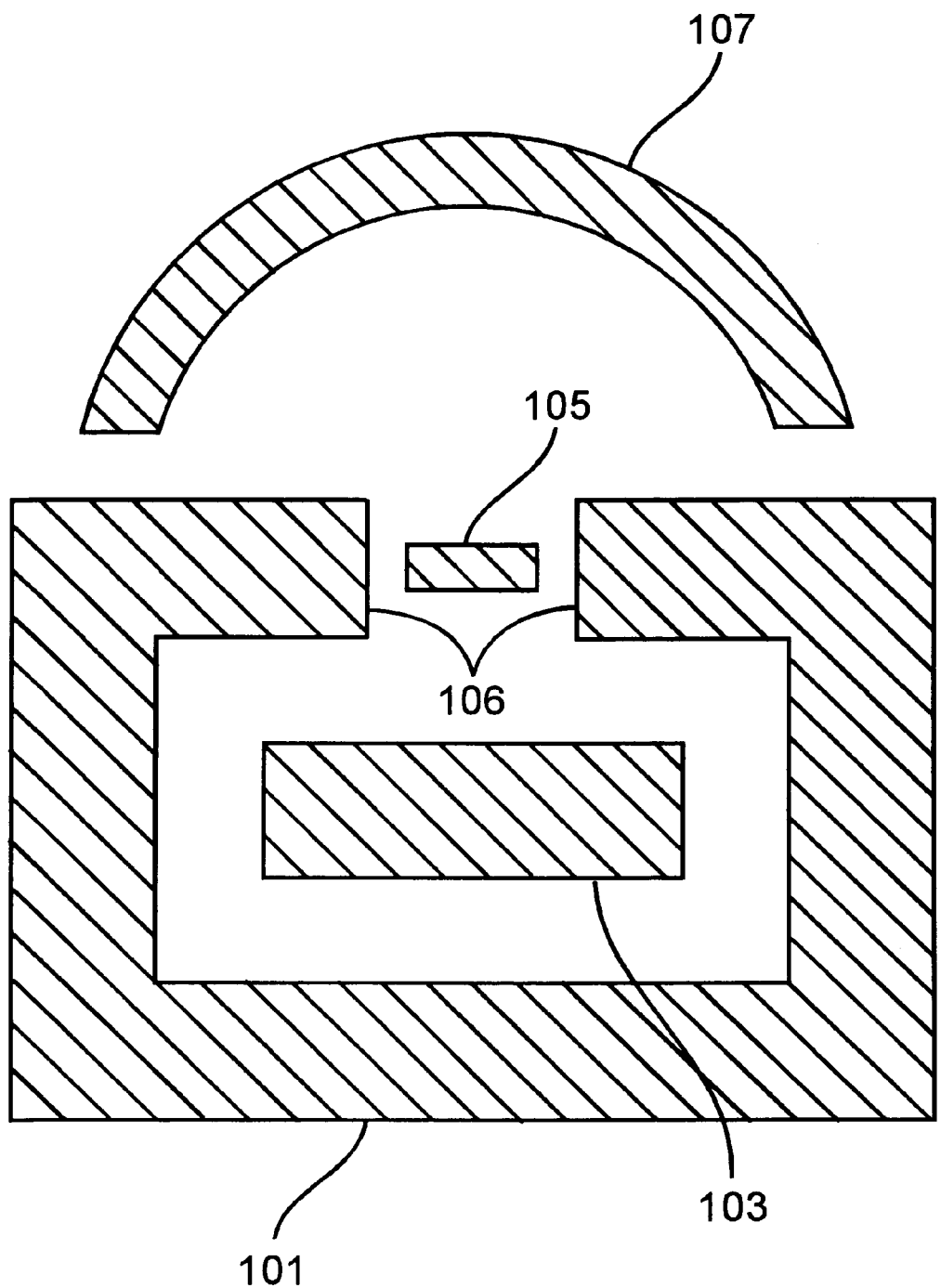
FIG. 1a shows the use of a GMR element as a sensing device on a single conductor.

FIG. 1a shows the use of a GMR 105 sensor element as a sensing device on a single conductor 103. The conductor 103 is show in cross-section enclosed by a magnetic hoop 101. The magnetic hoop is used to increase the sensitivity of the GMR sensor element and preferably contains a ferromagnetic material. These hoops made of soft magnetic material concentrate the magnetic flux surrounding the current carrying conductor 103 into the hoop 101 and the gap 106 in the hoop 101. The GMR sensor element 105 is placed in the gap 106 of the hoop 101 with its sensitive axis partially "bridging" the gap 106 in the hoop. A magnetic shield 107 is used to shield the GMR 105 sensor element from extraneous magnetic fields.

When a current flows through the conductor, a magnetic field is set up around the conductor through the hoop. If the current is AC, the magnetic field is AC whereas if the current is DC, the magnetic field is DC. The magnetic field causes a change in the resistivity of the GMR sensor element which is, for example, a linear device that is used as a measure of the electrical current flowing through the conductor. The fact that the GMR sensor element is sensitive to the strength of the magnetic field, rather than the rate of change of the magnetic field, means that the sensor can be used all the way down to zero frequency (DC).

Figure 1B:
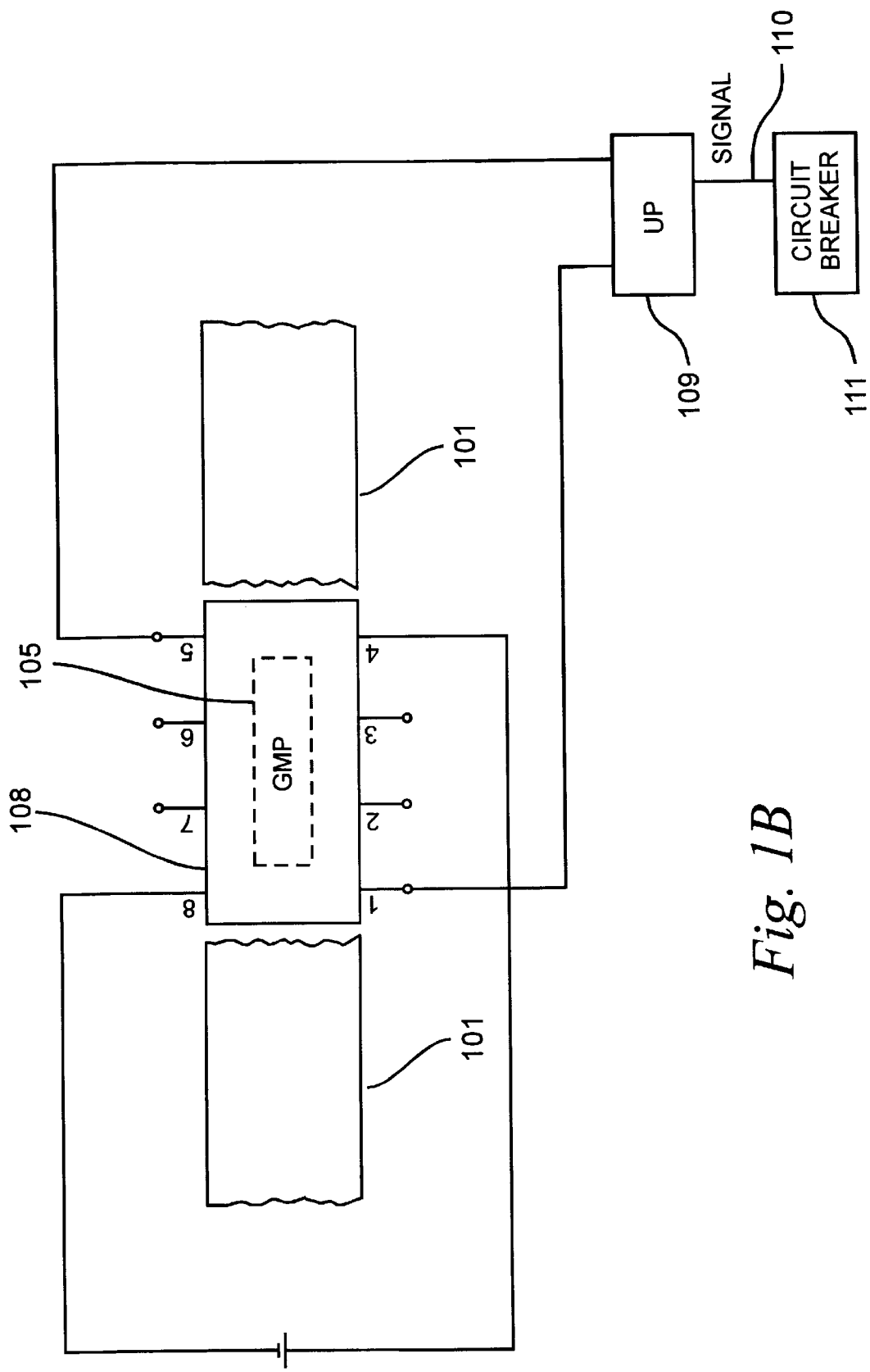
FIG. 1b shows a circuit in which the output of the GMR element is used as a control signal to an electronic trip unit of a circuit breaker.

FIG. 1b shows the use of the GMR 105 sensor element as part of a control circuit for operating a circuit breaker. The GMR sensor element is part of an 8 pin chip 107. Such a IC sensor chip is commercially available from Non Volatile Electronics, Inc., of Eden Prairie, Minn. as the NVS5B15 chip. This chip 108 has a sensitivity of 1.07 mV/ gauss when used with a 20 volt power supply, some twenty times the sensitivity of a Hall device. A power source 104 is used to power the chip, being connected to pins 4 and 8 of the chip 107. The chip is placed within the opening in the hoop 101. Ideally, there should be no gap between the ends of the chip 108 and the ends of the hoop 101. The conductor 103 is not shown in FIG. 1b. The output of the chip, between pins 1 and 5, is a voltage that is proportional to the magnetic field in the GMR sensor element 105 and the supply voltage. This output signal is received by a microprocessor 109 which uses the output voltage of the chip to send a trip signal 110 to the circuit breaker 111. The method of operation of the microprocessor and the circuit breaker would be familiar to those knowledgeable in the art.

When the device shown in FIG. 1b is used on a conductor carrying DC, the output is a steady voltage. Occurrence of a fault will change the output voltage and the microprocessor 109 operates the circuit breaker 111 by sending a trip signal 110 in accordance with programmed instructions and the change in the output voltage of the chip 108. When the device shown in FIG. 1b is used on a conductor carrying AC, under normal conditions, the output of the chip is a full-wave rectified AC voltage. An AC fault on the conductor increases the amplitude of the full-wave rectified AC voltage and hence its DC value. This increase in the DC value of the output voltage of the chip 108 is used by the microprocessor 109 to operate the circuit breaker 111 as before. A DC fault on the conductor positively biases the full-wave rectified AC voltage, regardless of the polarity of the DC ground fault current. This increase in the DC value of the output voltage of the chip 108 is used by the microprocessor 109 to operate the circuit breaker 111 as before.

The GMR output of three phases cannot be combined in any way to produce an accurate ground fault indication. However, the three GMR output of the three phases could be combined mathematically if the current direction in each of the phases is known. A method for doing this would be familiar to those versed in the art.

Figure 2:
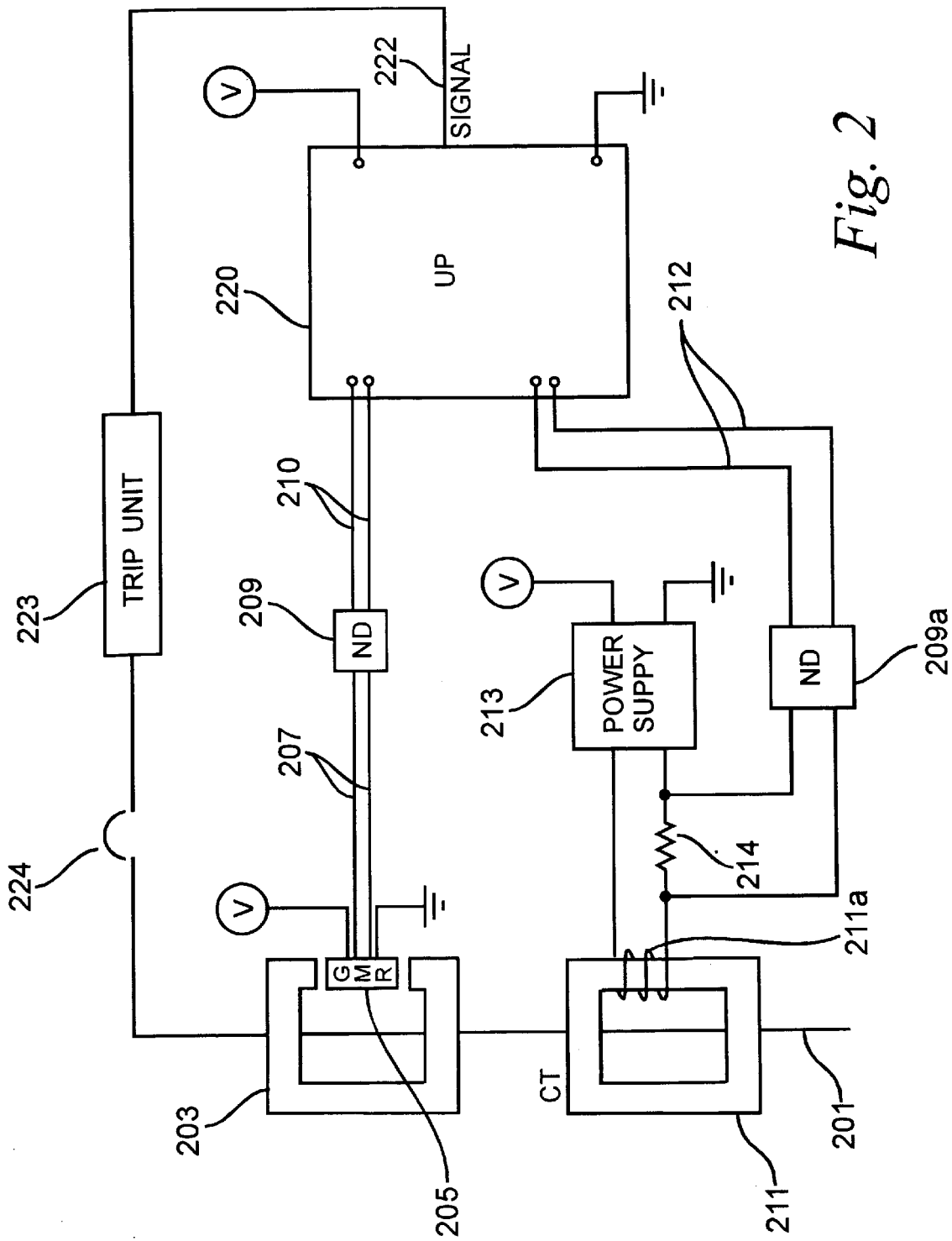
FIG. 2 shows an arrangement in which a GMR chip and a CT are used to measure a ground fault current.

FIG. 2 shows an arrangement in which a current transformer is used to provide this directional information for a single phase of a three-phase power system as well as provide the necessary power for the GMR chip and the microprocessor. Referring to FIG. 2, a GMR chip 205 is shown in the gap of a hoop 203 for measuring the current in a conductor 201. The output 207 of the chip 205 is converted to a digital signal 210 by an A/D converter 209. The power supply for the GMR chip is indicated by the V and the ground symbol. A current transformer (CT) 211 is used for a power supply as well as for providing information on the current direction. The secondary winding 211a of the CT 211 is connected to a power supply 213 and a resistor 214. The power supply 213 would be familiar to those versed in the art. For example, the power supply could be a diode bridge with a voltage regulator and an output capacitor. The output of the power supply is a DC voltage V that is used to power the GMR chip 205 and the microprocessor 220. The voltage across the resistor 214, substantially in phase with the current in the conductor 201, is converted to a digital signal 212 by the A/D converter 209a. The microprocessor 220 has two input signals: one is the digital output 210 of the GMR sensor, which is a full-wave rectified signal while the other signal is the digital voltage across the resistor 214, which is a half-wave rectified signal of what is picked up by the current transformer. The signal 212 is sufficient to provide information to the microprocessor 220 on the direction of the current in the conductor 201 as measured at line frequency. A similar arrangement is present on the other two phases. The microprocessor uses this and the digital signal 210 to provide a trip signal 222 to a trip unit 223 for tripping a circuit breaker 224. In FIG. 2, the A/D converters 209 and 209a are shown as being external to the microprocessor 220. Those knowledgeable in the art would recognize that the A/D converters could also be internal to the microprocessor.

The CT 211 shown in FIG. 2 has just enough iron cross section and turns to supply power at the rated current of the breaker. This is less than the iron and turns required for accurate measurements of the current. However, the CT 211 could be used as a backup sensor for providing information on AC ground faults.

Figure 3:
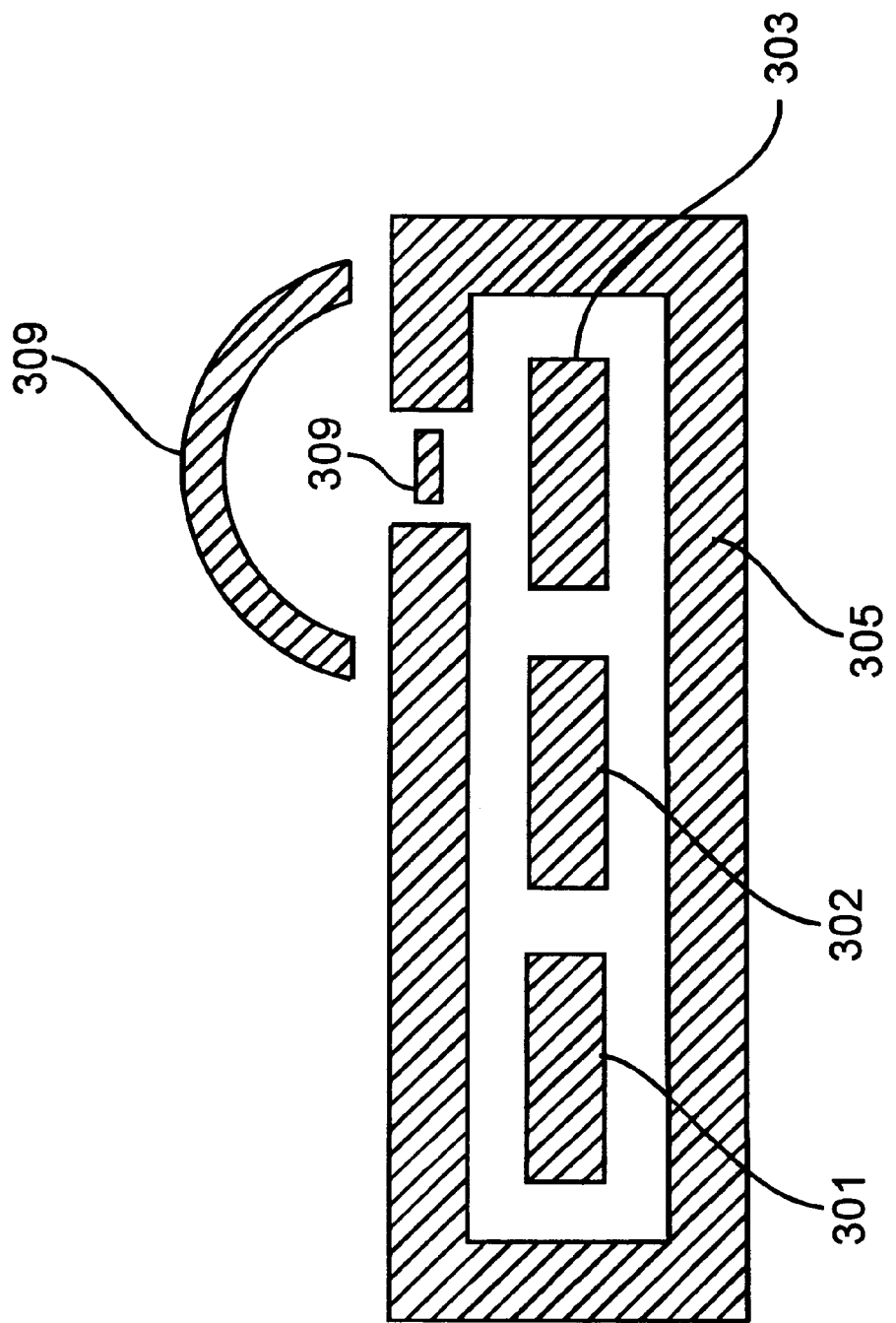
FIG. 3 shows a GMR element used to measure the current in a multiphase circuit..

Ground fault sensing can be accomplished for a three phase power system by a single GMR sensor if the conductors are closely spaced. FIG. 3 shows three closely spaced conductors 301, 302 and 303 of a three phase circuit. These are surrounded by a magnetic hoop 305 with a GMR chip 307 located in a gap in the hoop. A magnetic shield 309 is provided to screen the sensor from extraneous magnetic fields.

Figure 4:
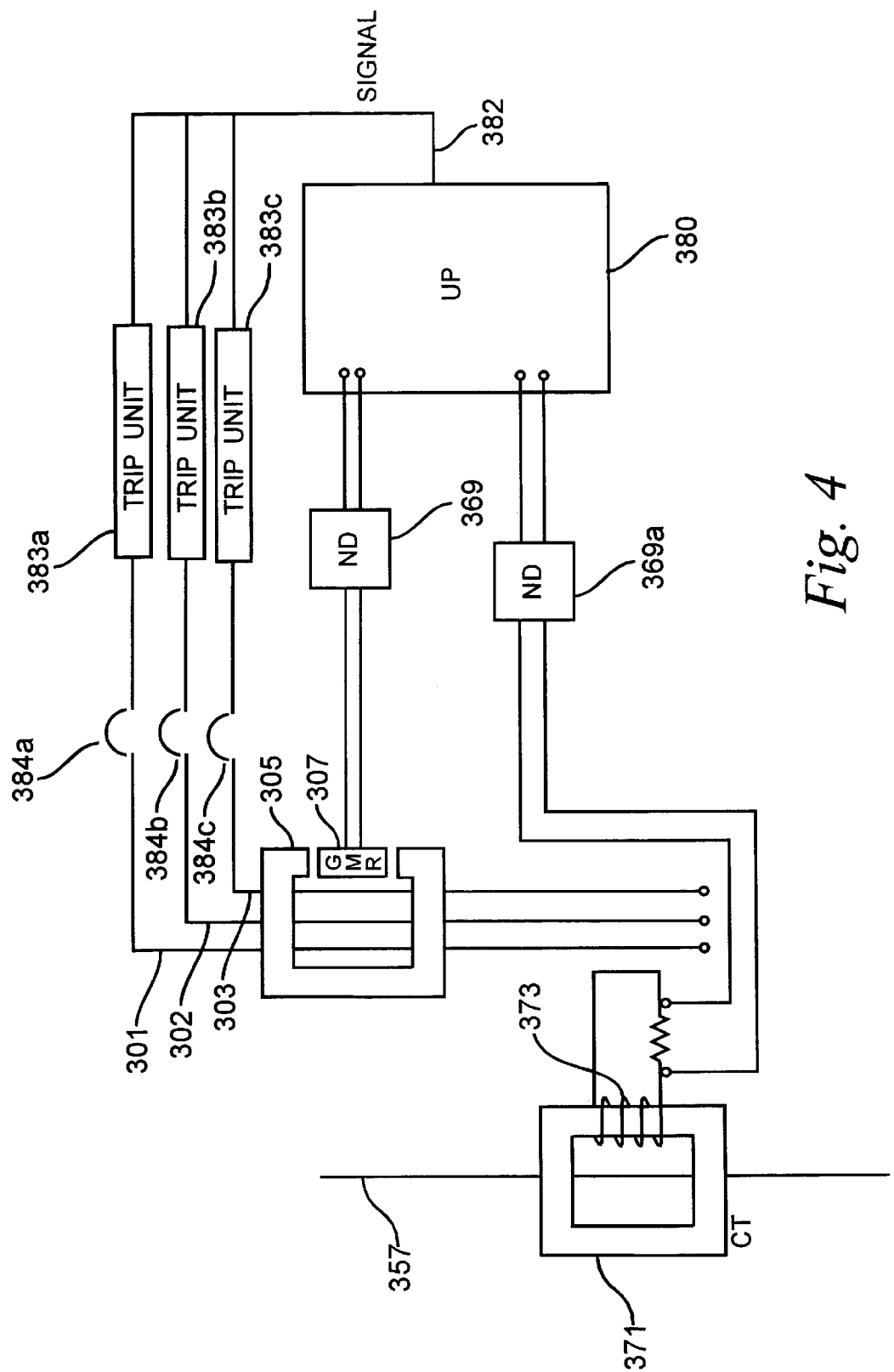
FIG. 4 shows the use of a GMR element to detect ground fault current in a multiphase circuit.

With the arrangement as shown, under normal operating conditions, the GMR chip will respond to the vector sum of the current in the three phases which would be equal to the current in the neutral line. Accordingly, the output of the GMR chip could be used by a microprocessor to generate a ground fault trip signal if the microprocessor is also provided with a signal representative of the neutral line current. FIG. 4 shows a circuit diagram of the implementation of a GMR chip for ground fault detection.

The three line conductors 301, 302 and 303 pass through the magnetic hoop 305 with the GMR chip 307 located in the gap of the hoop 305. The signal from the GMR chip 307 is input to a microprocessor 380 after A/D conversion at A/D converter 369. The current in the neutral line 357 is picked up by a current transformer (CT) 371. The output 373 of the (CT) 371 is picked up across the resistor 375, digitally converted at an A/D converter 369a and input to the microprocessor 380. The difference between the neutral line current and the GMR chip signal is an indication of ground fault and is used by the microprocessor 380 to provide a trip signal 382 to a plurality of trip units $383_A$, $383_B$, and $383_C$ for tripping an associated plurality of circuit breakers $384_A$, $384_B$, and $384_C$ respectively. Because the current in the neutral line is usually small, the CT does not need to have a large rating.

Several embodiments of the invention have been described. It will be obvious to those skilled in the art that various changes and modifications may be made therein without departing from the intent of the invention, and the purpose of the claims is to cover all such changes and modifications as fall within the true spirit and scope of the invention.

What is claimed is:

1. A power distribution circuit having a line carrying a current comprising:
   a circuit breaker for interrupting the flow of electrical current in the line, said circuit breaker having an open position and a closed position;
   a trip unit operatively coupled to the circuit breaker, adapted to be actuated by at least one activating signal, to move the circuit breaker from the closed position to the open position;
   a magnetoresistive device arranged electrically with the line for sending a first activating signal to the trip unit in response to a magnetic field associated with the current in the line to cause the trip unit to move the circuit breaker from the closed position to the open position; and
   a current sensing device having a magnetic core and a secondary winding, the current in the secondary winding responsive to the current in the line, for providing a second activating signal to the trip unit;
   wherein the current sensing device further provides operating power to the trip unit.

2. The power distribution circuit of claim 1 further comprising an integrated circuit device incorporating the magnetoresistive device.

3. The power distribution circuit of claim 2 further comprising a magnetic hoop surrounding the line, the magnetic hoop having a gap wherein the magnetoresistive device is located.

4. The power distribution of claim 2 wherein the intergrated circuit device comprises a linear device.

5. The power distribution circuit of claim 3 wherein the magnetic hoop contains a ferromagnetic material.

6. A circuit breaker for interrupting the flow of electrical current in an electric line, comprising:
   a switch connected in series with the line, the switch having an open position and a closed position;
   a trip unit operatively coupled to the circuit breaker, said trip unit adapted to be actuated by at least one activating signal to move the switch from the closed position to the open position;
   a magnetoresistive device associated with the electric line to send a first activating signal to the trip unit in response to a magnetic field associated with a current in the line to cause the trip unit to move the switch from the closed position to the open position; and
   a current sensing device having a magnetic core and a secondary winding, the current in the secondary winding responsive to the current in the line, for providing a second activating signal to the trip unit;
   wherein the current sensing device further provides operating power to the trip unit.

7. The circuit breaker of claim 6 further comprising an integrated circuit device incorporating the magnetoresistive device.

8. The circuit breaker of claim 7 wherein the intergrated circuit device comprises a linear device.

9. The circuit breaker of claim 7 further comprising a magnetic hoop surrounding the electric line, the magnetic hoop having a gap wherein the magnetoresistive device is located.

10. The circuit breaker of claim 9 wherein the magnetic hoop contains a ferromagnetic material.

11. The circuit breaker of claim 6, wherein the current in the line is a direct current.

12. The circuit breaker of claim 6, wherein the current in the line is an alternating current.

13. A power distribution circuit having a plurality of power lines and a neutral line, each carrying current comprising:
   (a) a plurality of circuit breakers for interrupting the flow of electrical current in each of the plurality of power lines, each of said plurality of circuit breakers having an open position and a closed position;
   (b) a plurality of trip units, each coupled to one of the plurality of circuit breakers, adapted to be actuated by at least one activating signal, to move its associated circuit breaker from the closed position to the open position;
   (c) a magnetoresistive device arranged electrically with the plurality of power lines to send a first activating signal to the plurality of trip units in response to the current in the plurality of power lines; and
   (d) a current sensing device comprising a magnetic core having a secondary winding to sense the current in the neutral line and send a second activating signal to the plurality of trip units in response thereto;
   wherein each of the plurality of trip units moves its associated circuit breaker from the closed position to the open position in response to said first and second activating signals.

14. The power distribution circuit of claim 13 further comprising an integrated circuit device incorporating the magnetoresistive device.

15. The power distribution circuit of claim 14 further comprising a magnetic hoop surrounding the plurality of lines, the magnetic hoop having a gap wherein the magnetoresistive device is located.

16. The power distribution circuit of claim 15 wherein the intergrated circuit device comprises a linear device.

17. The power distribution circuit of claim 15 wherein the magnetic hoop contains a ferromagnetic material..

18. A method of interrupting electrical current in an electrical circuit having a plurality of power lines and a neutral line, each said power line carrying a current comprising:
   connecting each of a plurality of circuit breakers to one of a plurality of power lines, each of said circuit breakers having an open position and a closed position;
   connecting each of a plurality of trip units to one of the plurality of circuit breakers, each of said trip units adapted to be actuated by at least one activating signal, to move the associated circuit breaker from the closed position to the open position;
   using a magnetoresistive device arranged electrically with the plurality of power lines to sense the current in the plurality of power lines and sending a first activating signal to the trip unit in response thereto; and
   connecting a current sensing device comprising a magnetic core having a secondary winding for sensing the current in the neutral line and providing a second activating signal to each of the plurality of trip units in response thereto;
   causing each of the plurality of trip units to move the associated circuit breaker from the closed position to the open position in response to the first and second activating signals.

* * * * *